(12) United States Patent
Kofler

(10) Patent No.: US 8,720,902 B2
(45) Date of Patent: May 13, 2014

(54) PRESSURE BALANCED RADIAL ROTARY SHAFT SEAL

(71) Applicant: Harald Kofler, Moon Township, PA (US)

(72) Inventor: Harald Kofler, Moon Township, PA (US)

(*) Notice: Subject to any disclaimer, the term of this patent is extended or adjusted under 35 U.S.C. 154(b) by 0 days.

(21) Appl. No.: 13/677,390

(22) Filed: Nov. 15, 2012

(65) Prior Publication Data

US 2013/0119611 A1 May 16, 2013

Related U.S. Application Data

(60) Provisional application No. 61/629,196, filed on Nov. 15, 2011.

(51) Int. Cl.
*F16J 15/32* (2006.01)
(52) U.S. Cl.
USPC .......................................... 277/558
(58) Field of Classification Search
None
See application file for complete search history.

(56) References Cited

U.S. PATENT DOCUMENTS

| | | | |
|---|---|---|---|
| 2,316,941 A * | 4/1943 | Dodge | 277/556 |
| 3,306,620 A * | 2/1967 | Taschenberg | 277/553 |
| 3,443,814 A | 5/1969 | Dahlheimer | |
| 3,687,464 A * | 8/1972 | Jackson et al. | 277/553 |
| 4,889,349 A | 12/1989 | Muller | |
| 5,364,111 A * | 11/1994 | Wunsch | 277/557 |
| 5,503,404 A * | 4/1996 | Newton et al. | 277/551 |
| 6,367,810 B1 | 4/2002 | Hatch | |
| 6,955,358 B2 * | 10/2005 | Iwakata et al. | 277/549 |
| 7,523,945 B2 * | 4/2009 | Kanda | 277/549 |
| 7,914,209 B2 * | 3/2011 | Yamamoto et al. | 384/147 |
| 2004/0251636 A1* | 12/2004 | Jordan | 277/553 |
| 2012/0292858 A1* | 11/2012 | Jordan | 277/558 |
| 2012/0306160 A1* | 12/2012 | Koch et al. | 277/558 |

FOREIGN PATENT DOCUMENTS

| | | |
|---|---|---|
| DE | 2101120 | 10/1972 |
| EP | 2177794 | 4/2010 |
| WO | 2007131468 | 11/2007 |

* cited by examiner

*Primary Examiner* — Vishal Patel
*Assistant Examiner* — Thomas Neubauer
(74) *Attorney, Agent, or Firm* — James Ray & Assoc

(57) ABSTRACT

In combination with a body defining an annular space and a member received for rotation or linear movement within the annular space, an annular seal includes a first sealing member defining a first sealing portion disposed in constant engagement with a peripheral surface of the member during the rotation or the linear movement thereof, a second sealing member defining a second sealing portion disposed in constant engagement with the first sealing member and radially aligned only with the first sealing portion, and a fluid pressure directed at least onto the second sealing member, whereby the second sealing portion is configured to bias the first sealing portion into the constant engagement with the peripheral surface of the member.

5 Claims, 15 Drawing Sheets

PRESSURE BALANCED RADIAL ROTARY SHAFT SEAL

CROSS-REFERENCE TO RELATED APPLICATIONS

This application is related to and claims priority from U.S. Provisional Patent Application Ser. No. 61/629,196 filed on Nov. 15, 2011.

FIELD OF THE INVENTION

The present invention relates, in general, to seals for rotary or linearly moving shafts and, more particularly, this invention relates to a pressure balanced radial seal for rotary or linearly moving shafts that employ one sealing member in abutting contact with the peripheral surface of the shaft and a second sealing member configured to bias the first sealing member into the abutting contact.

STATEMENT REGARDING FEDERALLY SPONSORED RESEARCH AND DEVELOPMENT n/a

REFERENCE TO SEQUENCE LISTING, A TABLE, OR A COMPUTER PROGRAM LISTING COMPACT DISC APPENDIX n/a

BACKGROUND OF THE INVENTION

As is generally well known, conventional radial rotary shaft lip seals are employed with a rotating shaft extending from a housing (enclosure) containing oil (or other fluid media), such as a pump or a motor. These seals operate to prohibit leakage of the fluid media to the atmosphere or lower pressure region, along the surface of the rotary shaft. Contact between the lip seal and the surface of the shaft is subject to various leakage contributors during use of the seal.

Generally, these seals are not pressure balanced and have a lower limited combined pressure and surface-speed application range when higher pressures and higher surface speeds are present due to increased heat generation and wear of the dynamic "Lip Seal Contact Area" where it interferes with the rotating shaft leading to premature seal failure and consequent equipment failure as fluid would leak out of the housing (enclosure).

Often seal face leakage rates will depend on pump/motor operating conditions. If operating vibration levels are high, the shaft suffers from excessive radial or axial movement or is misaligned excessively, leakage rates tend to be higher. Typically, seals leak more during dynamic operation than in a static condition under fluid pressure. During shaft rotation, a fluid film develops between the seal faces to separate them with a larger gap, which causes higher leakage. The dynamic operation may establish a non-flat face pattern which may leak more than when the seal is running. Wear of the seal contact portion, surface finish or roughness of the shaft, abrasives in the fluid are another contributors to leakage.

Accordingly, in one approach, efforts have been made to balance the lip seal by way of pressure or mechanical elements so as to compensate for wear and maintain positive contact thereof with the surface of the rotary shaft.

In another approach, U.S. Pat. No. 4,889,349 issued to Muller on Dec. 26, 1989 discloses a sealing arrangement wherein the lip seal is balanced by an O-ring with further use of the fluid pressure to force the O-ring into the contact with the lip seal.

However, it has been determined that further improvements are necessary to compensate for wear of the lip seal so as to minimize the fluid media leakage, particularly in applications associated with higher differential fluid media pressure and higher rotational speeds of the shaft.

SUMMARY OF THE INVENTION

In one embodiment, the invention provides an annular seal configured to be used within a body defining an annular space and a member received for rotation or linear movement within the annular space. The annular seal includes a first sealing member defining a first sealing portion disposed in constant engagement with a peripheral surface of the member during the rotation or the linear movement thereof. A second sealing member defines a second sealing portion disposed in constant engagement with the first sealing member and radially aligned only with the first sealing portion. A fluid pressure directed at least onto the second sealing member, whereby the second sealing portion is configured to bias the first sealing portion into the constant engagement with the peripheral surface of the member.

In another embodiment, the invention provides annular seal configured to be used within a body defining an annular space and a member received for rotation or linear movement within the annular space. The annular seal includes a first sealing member defining a first sealing portion disposed in constant engagement with a peripheral surface of the member during the rotation or the linear movement thereof. A second sealing member defines a second sealing portion disposed in constant engagement with the first sealing member and radially aligned only with the first sealing portion. A retaining member is provided to statically support the second sealing member and prohibit rotational movement of the first sealing member. A fluid pressure directed at least onto the second sealing member, whereby the second sealing portion is configured to bias the first sealing portion into the constant engagement with the peripheral surface of the member.

In yet another embodiment, the invention provides an annular seal configured to be used within a body defining an annular space and a member received for rotation or linear movement within the annular space. The annular seal includes a first sealing member defining a first sealing portion disposed in constant engagement with a peripheral surface of the member during the rotation or the linear movement thereof. A second sealing member defines a second sealing portion disposed in constant engagement with the first sealing member and radially aligned only with the first sealing portion. A fluid pressure directed at least onto the second sealing member, whereby the second sealing portion is configured to bias the first sealing portion into the constant engagement with the peripheral surface of the member. A second seal is disposed within a region of the low fluid pressure and the apertures are positioned between the seal and the second seals so as to evacuate the fluid leaking through the contact of the first seal with the member.

OBJECTS OF THE INVENTION

It is, therefore, one of the primary objects of the present invention to provide a pressure balanced seal for rotary shafts.

Another object of the present invention is to provide a pressure balanced radial seal for rotary shafts that employs one sealing member in abutting contact with the surface of the rotary shaft and a second sealing member configured to bias the first sealing member into the abutting contact with the surface of the rotary shaft due to pressure.

Yet another object of the present invention is to provide a pressure balanced radial seal for rotary shafts that employs a first sealing member configured as a lip type seal and a second sealing member configured as a generally U-shaped cup.

A further object of the present invention is to provide a pressure balanced radial seal for rotary shafts that employs a sealing member configured as a lip type seal that is press fitted within a bore of a housing containing the rotary shaft.

Yet a further object of the present invention is to provide a pressure balanced radial seal for rotary shafts that is generally prevented from axial rotation within a bore of a housing containing the rotary shaft.

Another object of the present invention is to provide a pressure balanced radial seal for rotary shafts that employs dynamic and static sealing elements.

An additional object of the present invention is to provide a pressure balanced radial seal for rotary shafts that is generally prevented from axial movement within the bore of the housing.

Another object of the present invention is to provide a pressure balanced radial seal for rotary shafts that is configured to seal a high fluid pressure region from a relatively low fluid pressure region.

Yet another object of the present invention is to provide a pressure balanced radial seal for rotary shafts that is configured as a unitary one-piece member.

Another object of the present invention is to provide a pressure balanced radial seal for rotary shafts that includes a plurality of elements operatively interfaced therebetween upon installation into the bore of the housing.

A further object of the present invention is to provide a pressure balanced radial seal for rotary shafts that is configured for use on pumps, gearboxes and other devices having the rotary shaft within a fluid media.

Another object of the present invention is to provide a pump, gearbox or other device having the rotary shaft within a fluid media and employing the above described pressure balanced radial seal.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
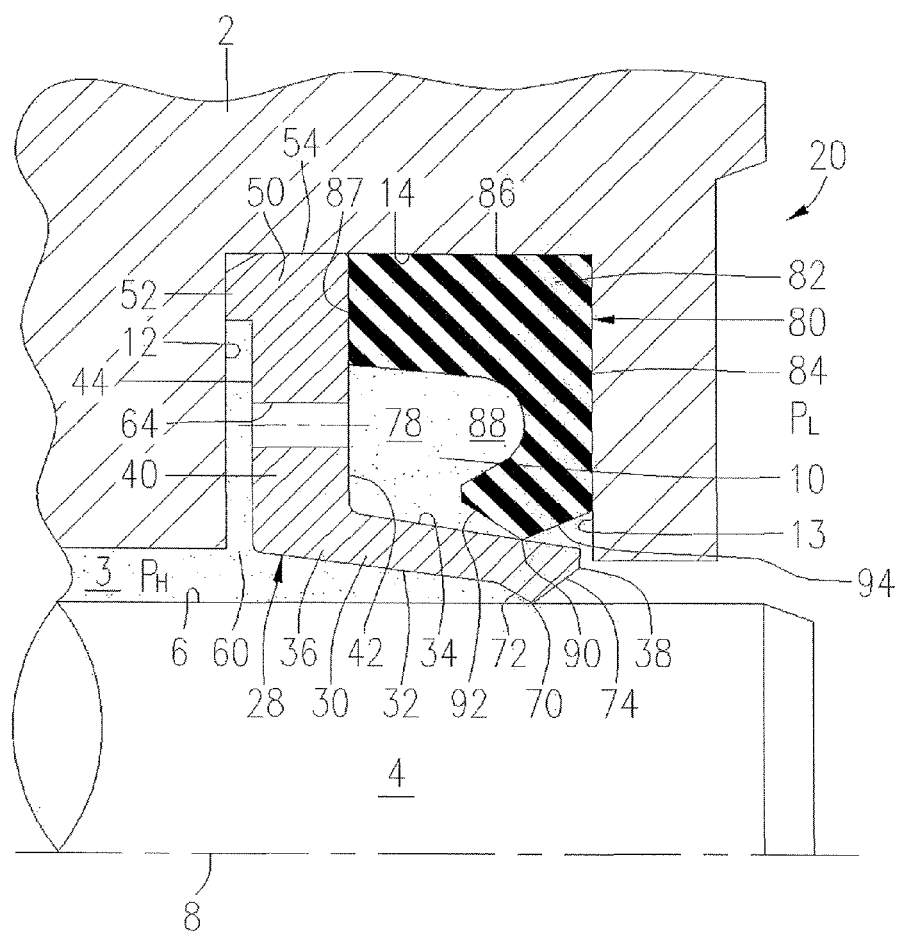
FIG. 1 is an enlarged partial cross-sectional view of one form of a pressure balanced radial seal for rotary shafts.

Prior to proceeding to the more detailed description of the present invention, it should be noted that, for the sake of clarity and understanding, identical components which have identical functions have been identified with identical reference numerals throughout the several views illustrated in the drawing figures.

The present invention describes a seal, generally designated as 20, which is configured to contact an elongated member having a generally smooth peripheral surface and commonly referred to as a shaft and which further provides means to substantially prevent leakage of the fluid under pressure from a region of high fluid pressure having such shaft extending therefrom. Conventionally, fluid is to mean both liquid and gas.

Reference is now made, to FIGS. 1-9, wherein the seal 20 is disposed within an interior space 10 of a body 2 further containing a member 4 received for rotation within the space 10. Preferably, interior space 10 is defined by a circular side surface 14 thereof, and the seal 20 has an annular shape in order to cooperate at an inner portion thereof with conventionally cylindrical or tubular member 4 and further cooperate at an outer portion thereof with the presently preferred circular side surface 14, although other shapes of the seal 20 are contemplated herein. Conventionally, the interior space 10 is provided as a cavity of FIGS. 1, 6, and 10-12; a bore of FIGS. 2-4, 7, 9, and 13; or groove of FIG. 14.

Now in further reference to FIGS. 1-4, seal 20 of one form includes a first sealing portion 70 disposed in constant contact with a peripheral surface 6 of the member 4 during rotation or linear movement thereof, a second sealing portion 90 radially aligned only with the first sealing portion 70, wherein fluid under pressure causes the second sealing portion 90 to maintain, bias or urge the first sealing portion 70 into such constant contact with the peripheral surface 6.

Figure 2:
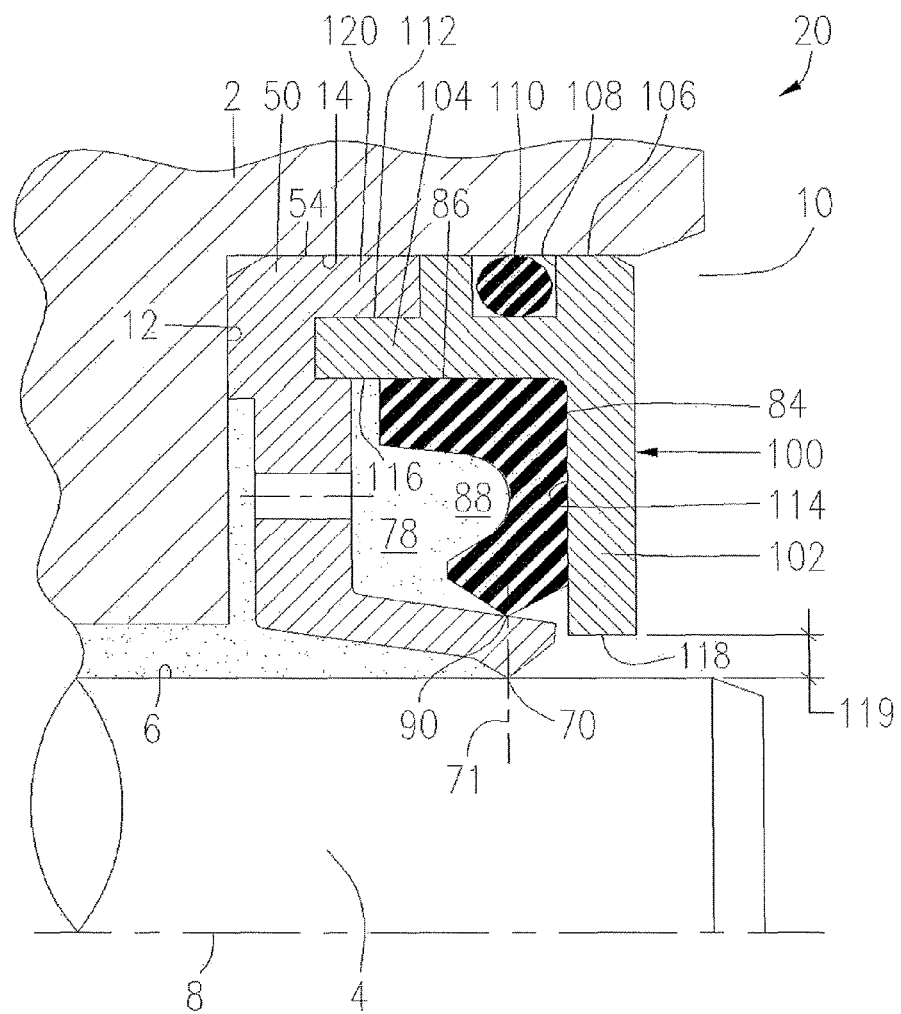
FIG. 2 is an enlarged partial cross-sectional view of another form of a pressure balanced radial seal for rotary or linearly moving shafts.

In yet a further reference to FIGS. 1-4, the seal 20 of another form includes a first sealing member 28, preferably of a unitary one piece construction, configured as a dynamic sealing member and defining a first sealing portion 70 disposed in constant engagement with a peripheral surface 6 of the member 4 during rotation or linear movement thereof. There is also a second sealing member 80 configured as a static sealing member and defining a second sealing portion 90 disposed in constant engagement with the first sealing member 28 and radially aligned only with the first sealing portion 70 along the sealing plane 71, as best shown in FIG. 2. In operation, a fluid under pressure from a region 3 of relatively high fluid system pressure is directed at least onto the second sealing member 80, whereby the second sealing portion 90 is configured to maintain, bias or urge the first sealing portion 70 into the constant engagement or direct contact with the peripheral surface 6 of the member 4. Preferably, each of the first and second sealing portions, 70 and 90 respectively, has a circular shape so as to cooperate with a conventional cylindrically shaped member 4, although other shapes are also contemplated by the instant invention to operatively mate with members 4 having alternative cross-sections.

Preferably, each of the first and second sealing portions, 70 and 90 respectively, includes a pair of angled surfaces converging with each other to define a generally triangular cross-section of the first and second sealing portions prior to rotation and/or installation of the member 4, although other cross-sectional shapes are also contemplated by the instant invention.

More specifically, the first sealing member 28 includes a first portion or a lip 30 having a pair of generally planar surfaces 32 and 34 spaced apart from each other to define a generally uniform thickness of the first portion 30. The first portion 30 further defines a proximal end 36 and a distal end 38. The proximal end 36 is meant herein as the end that is positioned adjacent to a bottom surface 12 of the interior space 10 in a spaced apart relationship with the peripheral surface 6 of the member 4. The bottom surface 12 is defined herein as the surface being closest to the region 3 of high fluid system pressure and being disposed generally normal to a longitudinal axis 8 of the member 4. The first portion 30 may be of a generally tubular shape disposed concentric with the longitudinal axis 8, but is preferably disposed at an acute angle relative to such longitudinal axis 8 wherein the distal end 38 is positioned closer to the peripheral surface 6 than the proximal end 36, thus essentially defining a frustoconically shaped first portion 30.

There is also a second portion 40 that extends from a proximal end 36 of the first portion 30 in a direction generally normal to the longitudinal axis 8 of the member 4 and that has a pair of generally planar surfaces 42 and 44 spaced apart from each other to define a generally uniform thickness of the second portion 40.

The generally uniform thickness of the first portion 30 is thinner than the generally uniform thickness of the second portion 40 and wherein the first portion is configured to flex during installation or rotation of the member 4.

At least the first portion and, preferably, the first sealing member 28 is preferably manufactured from a plastic or engineered polymer material.

A radial gap or passageway 60 is formed between one generally planar surface of the second portion 40, shown as the surface 42 and the bottom surface 12 of the interior space 10. The radial gap 60 or passageway is provided in open communication with a hollow inner region 3 of the body 2 containing the fluid under high pressure $P_H$.

Figure 5:
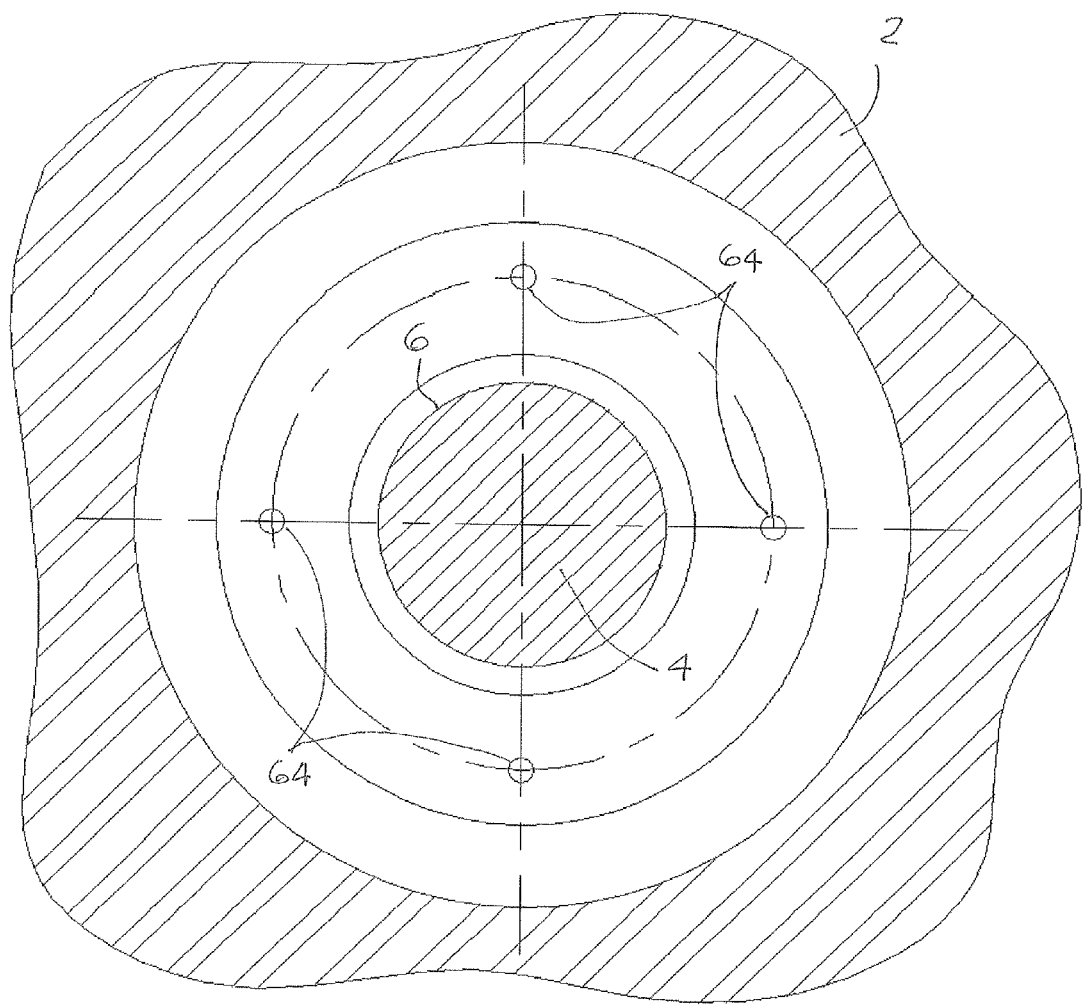
FIG. 5 is a partial side elevation view along lines V-V of FIG. 3.

One or more apertures 64 are formed in a radially spaced apart relationship with each other through the thickness of the second portion 40, as is best shown in FIG. 5.

The first portion 30 carries the above mentioned first sealing portion 70 being disposed on one surface, referenced with numeral 32, of the first portion 30, in close proximity to the distal end 38 of the first portion 30. It is presently preferred for the first sealing portion 70 to extend above the surface 32 of the first portion 30 and be further defined by a pair of angled surfaces 72 and 74 converging with each other at the abutting engagement with the peripheral surface 6 of the member 4 to define a generally triangular cross-section of the first sealing portion 70. However, a generally trapezoidal cross-section of the first sealing portion 70 is also contemplated as, particularly during use, the first sealing portion 70 undergoes radial compression and wear. In other words, the first sealing portion 70, which is illustrated in the figures as generally having a circular line type contact with the peripheral surface 6 will radially compress and flatten, thus transforming into a circular surface type contact. Furthermore, the first sealing portion 70 may be provided in a curved shape.

The second sealing member 80, also preferably provided of a unitary one piece construction, includes an annular shaped continuously solid body 82 which may be provided in different cross-sectional shapes including generally straight, U-shaped, J-shaped or L-shaped configurations in a plane normal to the longitudinal axis 8. In either configuration, the body 82 includes a first portion with at least one generally planar surface 84 disposed normal to the longitudinal axis 8.

Figure 4:
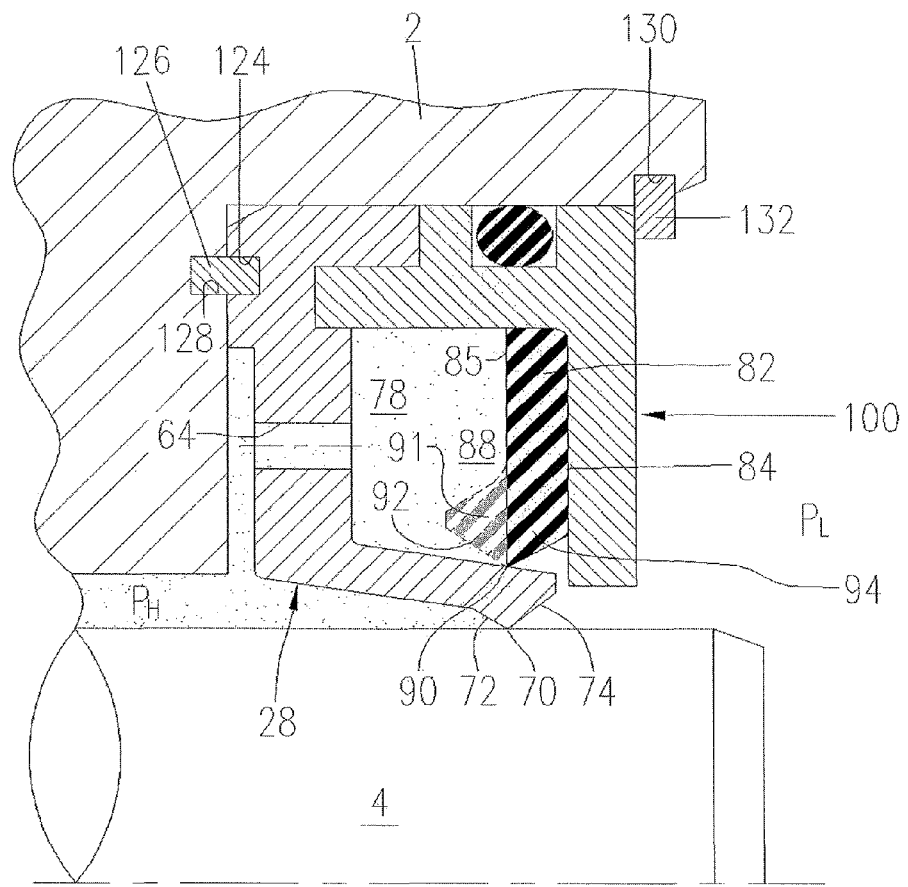
FIG. 4 is an enlarged partial cross-sectional view of yet another form of a pressure balanced radial seal for rotary or linearly moving shafts.

Now in a particular reference to FIG. 4, the second sealing member 80 of one form is provided in a generally straight configuration defined by a pair of generally planar surfaces 84 and 85 spaced apart from each other to define a generally uniform thickness of the second sealing member 80. In this form, the second sealing portion 90 is defined by a corner formed by the inner surface 85 and an end surface 94. Although end surface 94 has been shown as inclined relative to surfaces 84, 85, it can be also disposed normal thereto or even be adapted with a curved shape. In further reference to FIG. 4, the surface 85 of the second sealing member 80 may be provided with an abutment 91 having a surface 92 extending from the above described corner and being complementary shaped to the surface 94, wherein the abutment 91 defines a generally L-shaped configuration of the second sealing member 80. As it can be further seen from FIG. 4, the second sealing portion 90, now defined by surfaces 92 and 94 converging with each other at the engagement with the surface 34 of the first sealing member 30, has a generally triangular shape, although other shapes are also contemplated, as the second sealing portion 90 will also undergo radial compression and wear.

Figure 3:
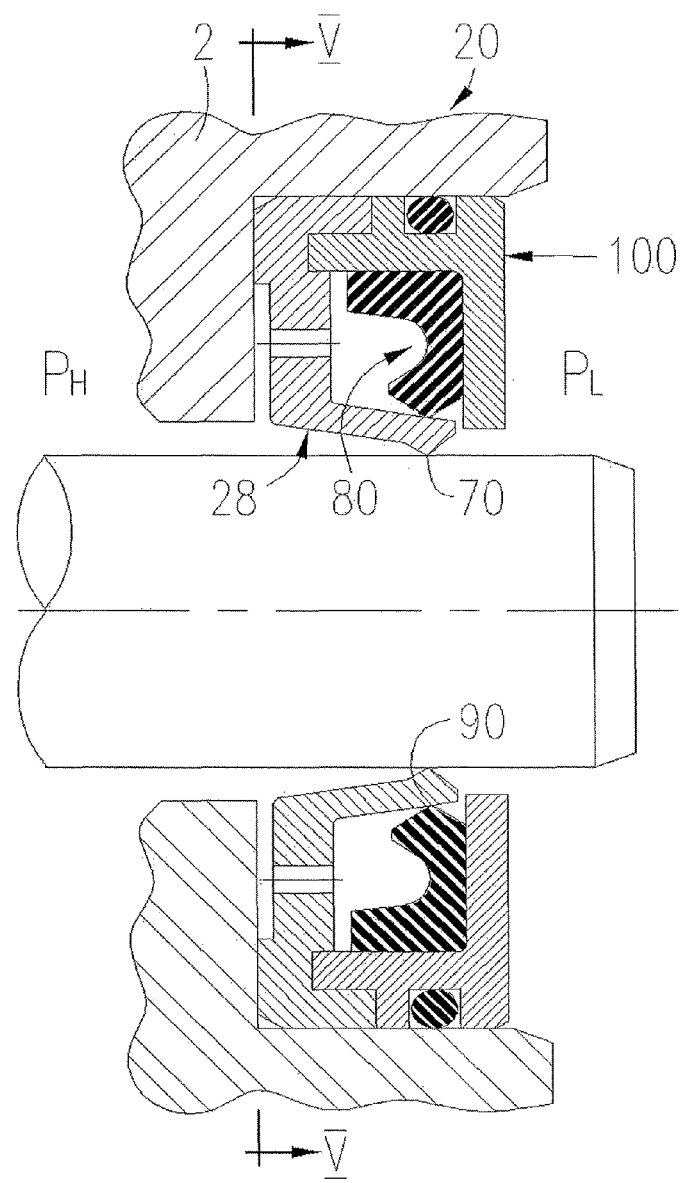
FIG. 3 is a partial cross-sectional view of the seal of FIG. 2.

Now in a particular reference to FIGS. 1-3, the abutment 91 defines a cavity 88 facing the second portion 40 of the first sealing member 28. When the body 82 is provided as having either U-shaped or J-shaped cross-sections, there is a surface 86 defining the peripheral edge of the second sealing member 80.

In further reference to FIG. 1, a generally planar surface 87, being disposed normal to the longitudinal axis 8, is positioned to abut the surface 42 of the first sealing member 28 and the second sealing member 80 is sized so as to apply axial force onto the first sealing member 28 sufficient to prevent rotation thereof during rotation of the member 4. Either the first sealing member 28 or the second sealing member 80 may compress here. Thus, in this form, the second sealing member 80 also provides means for preventing rotation of the first sealing member 28. Alternatively, as best shown in FIGS. 2-3, the edge surface 87 may be spaced at a distance from the surface 42 of the first sealing member 28.

The second sealing member 80 is preferably manufactured from an elastic material with the hardness thereof depending on the application.

In further reference to FIGS. 2-4, and in accordance with a presently preferred embodiment, the seal 20 includes a third portion 50 of the first sealing member 28 terminating the second portion 40 thereof and having a generally planar first surface 52 positioned in direct abutment with the bottom surface 12 of the interior space 10. Another surface 54 is positioned in direct abutment with a side surface 14 of the interior space 10 and defines exterior peripheral surface of the first sealing member 28. The surface 52 of the third portion 50 is offset from the surface 44 of the second portion 40, thus providing the above described radial gap or passageway 60, however, the bottom surface 12 of the interior space 10 can be adapted with a step to form such radial gap or passageway 60 and allow planar relationship of the surfaces 44 and 52.

Preferably, the surface 54 of the third portion 50 is sized for interference or friction fit with the side surface 14 of the interior space 10.

In the presently preferred embodiment, the seal 20 further includes an annular retaining member 100 having a pair of portions 102 and 104 defining a generally L-shaped cross-section of the retaining member 100, with the portion 102 being disposed normal to the longitudinal axis 8. The second sealing member 80 is preferably disposed in a press fit manner with the other portion 104 of the retaining member 100. The other portion 104 of the retaining member 100 further cages a portion of the first sealing member 28 within the interior space 10. A circumferential groove 108 is provided on another portion 104 of the retaining member 100 in open communication with the side surface 14 of the interior space 10. Surface 106 of the other portion 104 may be sized to abut the side surface 14 of the interior space 10 frictionally or in a press fit manner. An optional anti-rotation means, such as an O-ring 110 or equivalent compressible and resilient member may be positioned within the circumferential groove 108 and configured so as to exert force onto the side surface 14 of the interior space 10 during use of the seal 20. In this embodiment, the surface 106 will be sized to be disposed at a slight clearance with the side surface 14. Furthermore, the optional O-ring 110 behaves as a static seal. Additionally, O-ring 110 may be provided in other shapes, such as an oval, rectangular, square and the like, as for example shown in FIG. 10.

When the seal 20 includes the retaining member 100, the first sealing member 28 is preferably adapted with an annular flange 120 disposed within a notch 112 in the portion 104 and frictionally caged between a surface of the portion 104 and the side surface 14 of the interior space 10, wherein each surface of the flange 120 directly abuts a respective surface of the portion 104 or the side surface 14.

Furthermore, when the seal 20 includes the retaining member 100, the second sealing member 80 is configured so that the surfaces 84 and 86 are in direct contact with the respective inner surfaces 114 and 116 of the retaining member 100, with the surface 86 being sized for frictional fit. In this manner, the second sealing member 80 is allowed to move radially within the interior space 10.

Finally, the inner edge surface 118 of the retaining member 100 is spaced from the peripheral surface 6 at a distance 119 sufficient to prevent the distal end 38 of the first portion 30 of the first sealing member 28 to be pushed under pressure into the resulting gap.

Retaining member 100 and/or frictional engagement of the first sealing member 28 and/or annular flange 120 with the side surface 14 of the interior space 10 provides anti-rotation means to prevent rotation of the first sealing member 28 during use. Alternatively, the first sealing member 28 may be adapted with alternative anti-rotation means, such as one of more aperture, bore or cavity 124 having axis thereof disposed substantially parallel to the longitudinal axis 8, one or more elongated members 126 having one end thereof sized for insertion into the one of more aperture, bore or cavity 124 and one or more other aperture, bore or cavity 128 provided in the body 2 and sized to receive an opposite end of the one or more elongated members 126. Alternatively or in addition to, the one of more aperture, bore or cavity 124 may be provided in the side surface 14 and the one or more other aperture, bore or cavity 128 may be provided in the third portion 50 or in the flange 120. Advantageously, such embodiment allows positioning of the first sealing member 28 in spaced apart relationship with the surfaces 12 and 14 of the interior space 10 so as to extend the radial passageway or gap 60, allows to provide another passageway or gap 61 for flow of the fluid pressure into the high pressure region 78 and further allows elimination of the above described one or more apertures 64, as best shown in FIG. 6.

When the interior space 10 is provided as the bore of FIGS. 2-4 being in open communication with an exterior surface of the body 2, the side surface 14 may be adapted with optional a circumferential groove 130 and the seal 20 may provided with optional retaining clip 132. It is also within the scope of the invention to provide the groove 130 on the peripheral surface 6 of the member 4 or to replace the groove 130 and clip 132 with any other means sufficient to prohibit axial movement of the seal 20.

Figure 6:
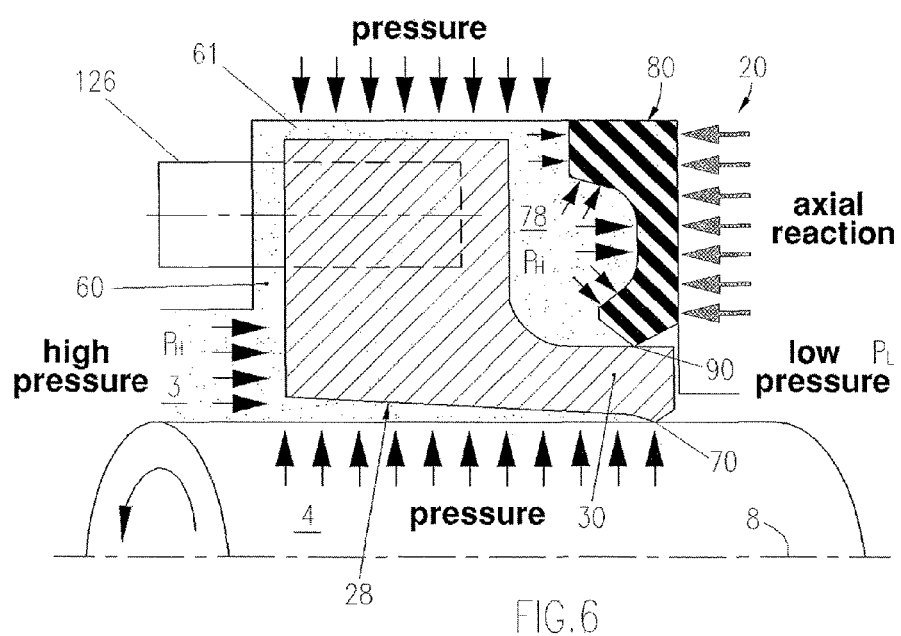
FIG. 6 illustrates a diagram of fluid pressure and relational forces acting on the seal of FIGS. 1-5.

In operation, as best shown in FIG. 6, one or more apertures 64 or another passageway or gap 61 are sized to pass the system fluid pressure from the region 3 of high fluid pressure into the high pressure region 78, also including the cavity 88. Fluid pressure will then exert force onto the second sealing member 80 which is preferably manufactured from an elastomeric material. Therefore, the system fluid pressure in region 78 will push the second sealing member 80 outwards onto the retaining member 100 and in all other directions including the second sealing portion 90.

More particularly, the fluid pressure in region 78 will maintain, urge or bias the second sealing portion 90 in continuous direct contact with the first portion 30 of the first sealing member 28 and will further maintain, urge or bias the first sealing portion 70 in the constant engagement with the peripheral surface 6 of the member 4, sufficient to essentially eliminate most if not all fluid leakage through the contact of the first sealing portion 70 with the peripheral surface 6.

The second sealing portion 90 is positioned in general radial alignment with only the first sealing portion 70 along sealing plane 71, as best shown in FIG. 2. This radial alignment is significant in that the maximum benefit from the fluid pressure in high pressure region 78 is realized at the first sealing portion 70 and not in other locations of the first portion 30 of the first sealing member 28, particularly in view of fluid pressure under the surface 32 urging the first sealing portion 30 away from the contact with the peripheral surface 6 of the member 4. It has been found that during, the second sealing portion 90 will move axially and will slightly deviate from such radial alignment due to reciprocal presence or absence of such pressure operation or due to manufacturing tolerances and, accordingly, the seal 20 has been configured to accommodate such axial movement of the second sealing portion 90 and has been configured to even accommodate slight radial misalignment between the sealing portions 70 and 90. It will be understood that movement of the second sealing portion 90 to the right of sealing plane 71 in FIG. 2 will increase sealing force onto the peripheral surface 6 of the member 4 resulting in higher than desirable operating temperatures and wear of the first sealing portion 70. It will be further understood that movement of the second sealing portion 90 to the left of sealing plane 71 in FIG. 2 will decrease sealing force onto the peripheral surface 6 of the member 4 aiding in lifting of the first portion 30 of the first sealing member 28 away from the peripheral surface 6 and thus resulting in greater than desired leakage from the first sealing portion 70. Thus, the axial misalignment between the first and second sealing portions, 70 and 90 respectively, is critical and is generally dictated by the diameter or cross-sectional size and surface finish of the member 4, materials of the first and second sealing members, 28 and 80 respectively, operating pressures and temperatures.

Figure 9:
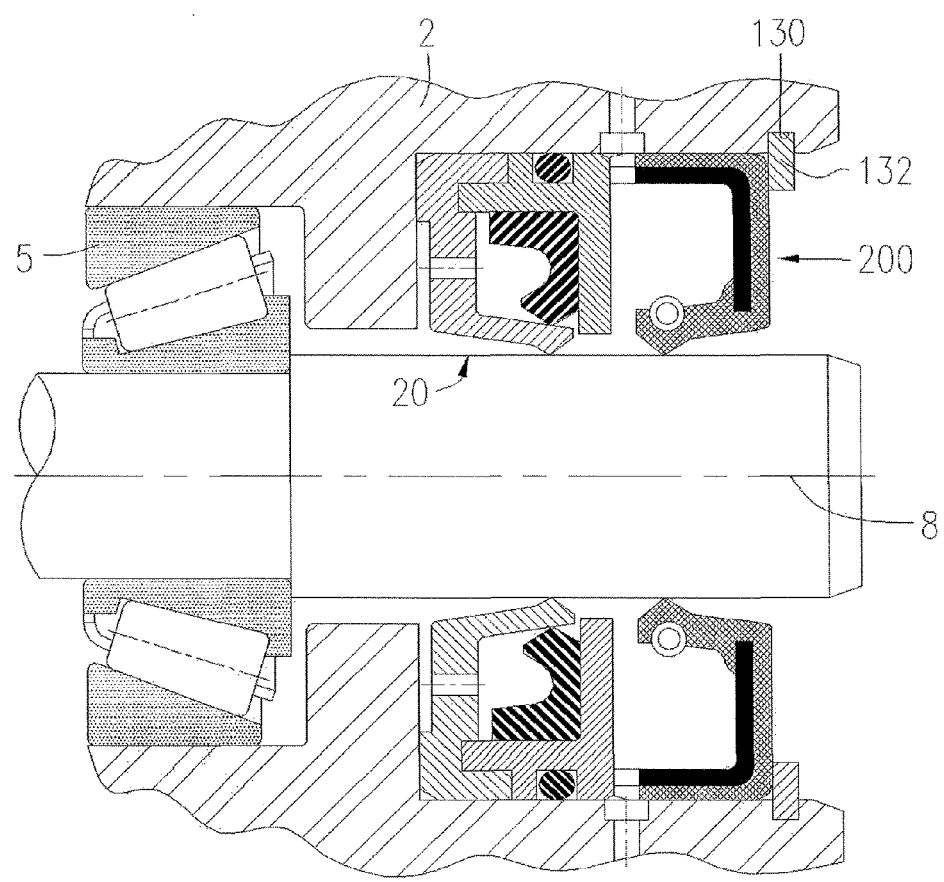
FIG. 9 is one partial cross-sectional environmental view of the seal of FIG. 1-5 or 7 employed within a pump or gear motor.

The above described seal 20 is configured to seal a high fluid pressure region 3, identified by pressure $P_H$, within the body 2 from a relatively low fluid pressure region, identified by pressure $P_L$, outside of the body 2. The body 2 may be a conventional housing of a pump or gear motor, as best shown in FIG. 9, and it is contemplated for the seal 20 to also include such housing. It is further contemplated that the passageway 60 and/or passageway 61 may be provided as channels or groves within the first sealing member 28 and generally define means for passing the fluid from region 3 of high system fluid pressure into the high fluid pressure region 78. It would be understood that channels or grooves 60 will be aligned with respective apertures 64 and further eliminate the need for the third portion 50 of the first sealing member 28, wherein the surface 44 of the second portion 40 may be configured for direct contact with the bottom surface 12 of the interior space 10.

In the instant invention, the first sealing member 28 functions as a dynamic seal and the second sealing member 80 functions as a static seal. Pressure in the high fluid pressure region 78 is balanced by utilizing the system fluid pressure from region 3 of the equipment with the second sealing element 80 receiving the pressure and controlling the radial force of the first sealing portion 70.

It has been found that this pressure balanced design of the seal 20 reduces the radial lip force and the wear of the first sealing portion 70 while increasing the service life and predictable and consistent operation of the seal 20 in absence of mechanical elements or mechanically aided biasing.

Use of the second sealing portion 90 to apply force onto the first portion 30 of the first sealing member 28 and, more particularly, to bias the first sealing portion 70 into the constant direct contact with the peripheral surface 6 of the member 4 has been found advantageous to prior art O-ring in consistently and predictably eliminating high leakage rates, particularly in applications characterized by high differential pressures and high rotational speeds of the member 4 and has been found advantageous to prior art mechanical or O-ring biasing in reducing component and installation costs.

However, the instant invention allows for some fluid leakage through contact of the first sealing portion 70 with the peripheral surface 6 of the member 4 and, therefore, provides a second seal, generally designated as 200, and means to pass fluid external to the interior space 10.

Figure 7:
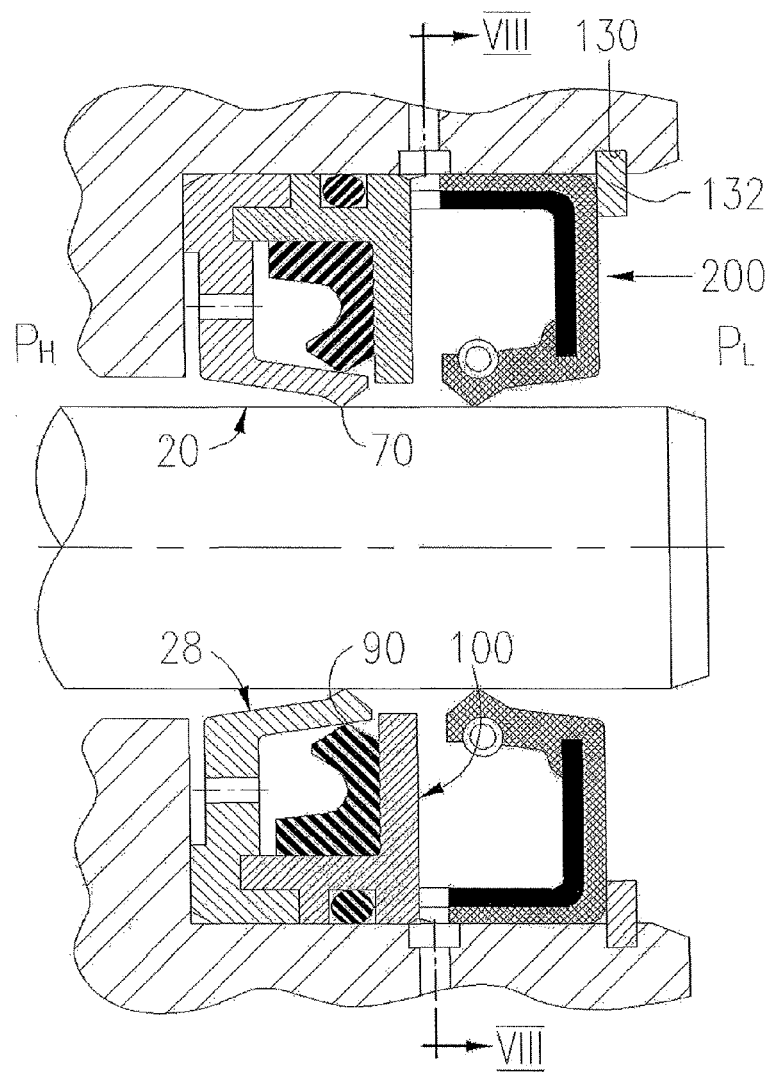
FIG. 7 is a partial cross-sectional view of yet another form of a pressure balanced radial seal for rotary or linearly moving shafts.
Figure 8:
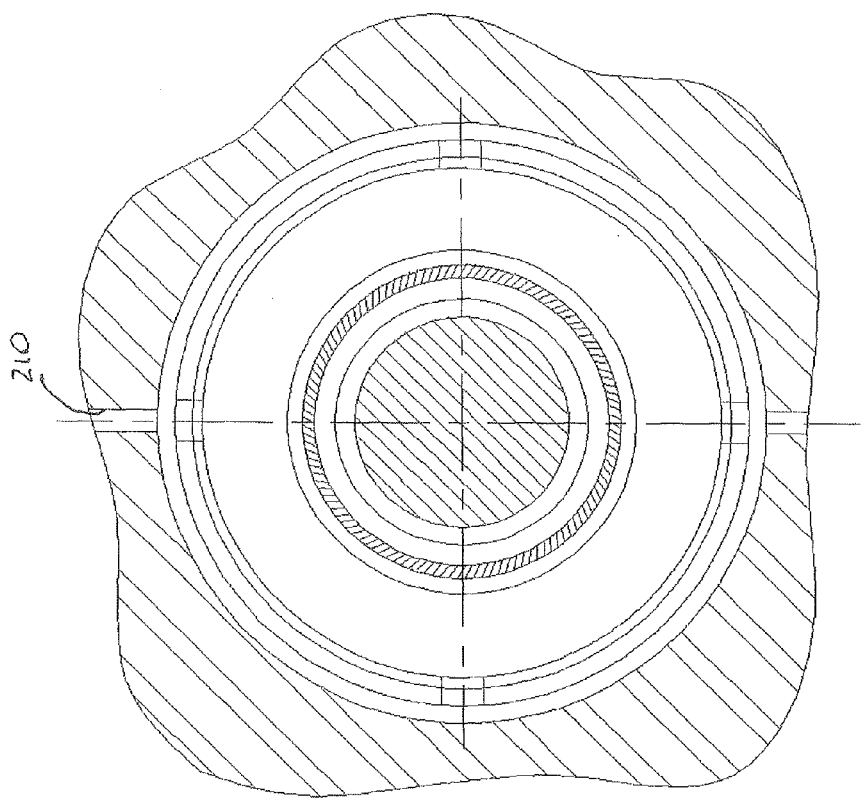
FIG. 8 is a partial side elevation view along lines VIII-VIII of FIG. 7.

Now in reference to FIGS. 7-9, the second seal 200 is positioned in axial spaced relationship with the seal 20 within the region of low fluid pressure $P_L$, so as to direct any fluid leakage through the seal 20 into one or more drainage apertures 210 provided through the body 2 and through the second seal 200. The annular seal 200 may be of a conventional lip type seal having one leg abutting a portion of the seal 20, shown as the above described retaining member 100, so as to prevent axial movement of the seal 20. When the second seal 200 is provided, the groove 130 and the retaining clip 132 are positioned on the outside of the annular seal 200.

Advantageously, the second seal 200 and the drainage apertures 210 may be employed in combination with any conventional seals, for example as disclosed in U.S. Pat. No. 4,889,349 whose teachings are incorporated in this document by reference thereto.

Figure 10:
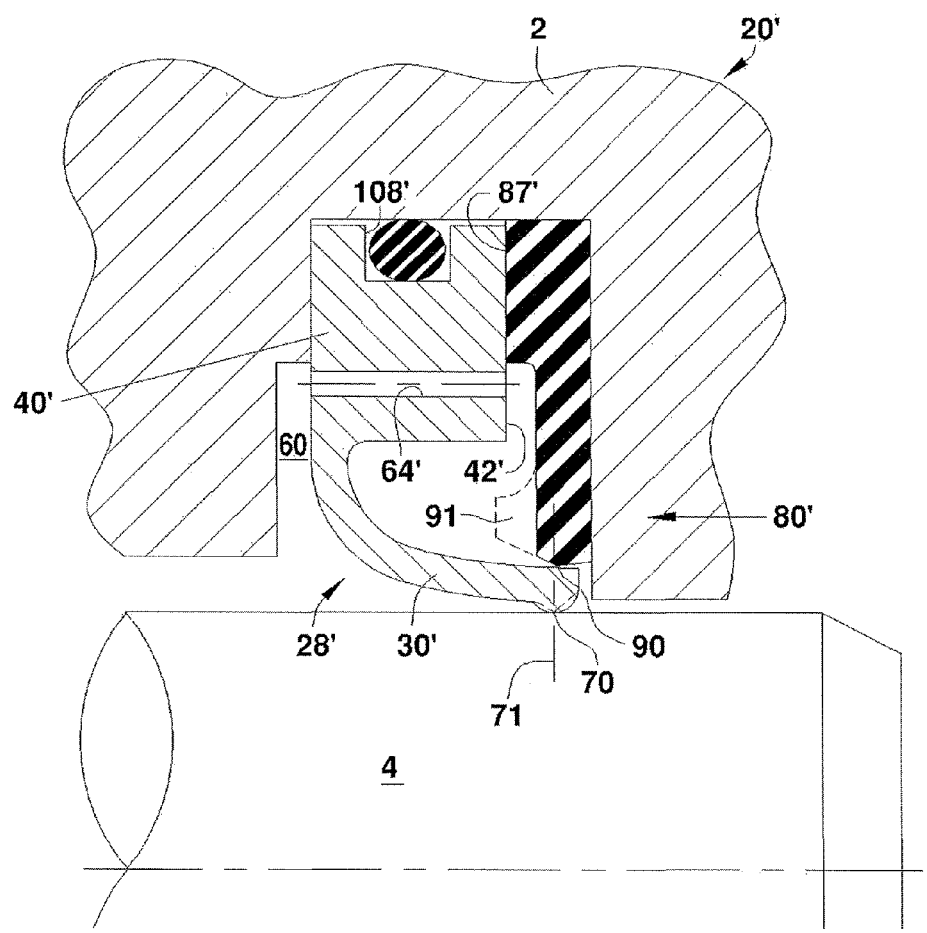
FIG. 10 is a partial cross-sectional view of a further form of a pressure balanced radial seal for rotary or linearly moving shafts.
Figure 11:
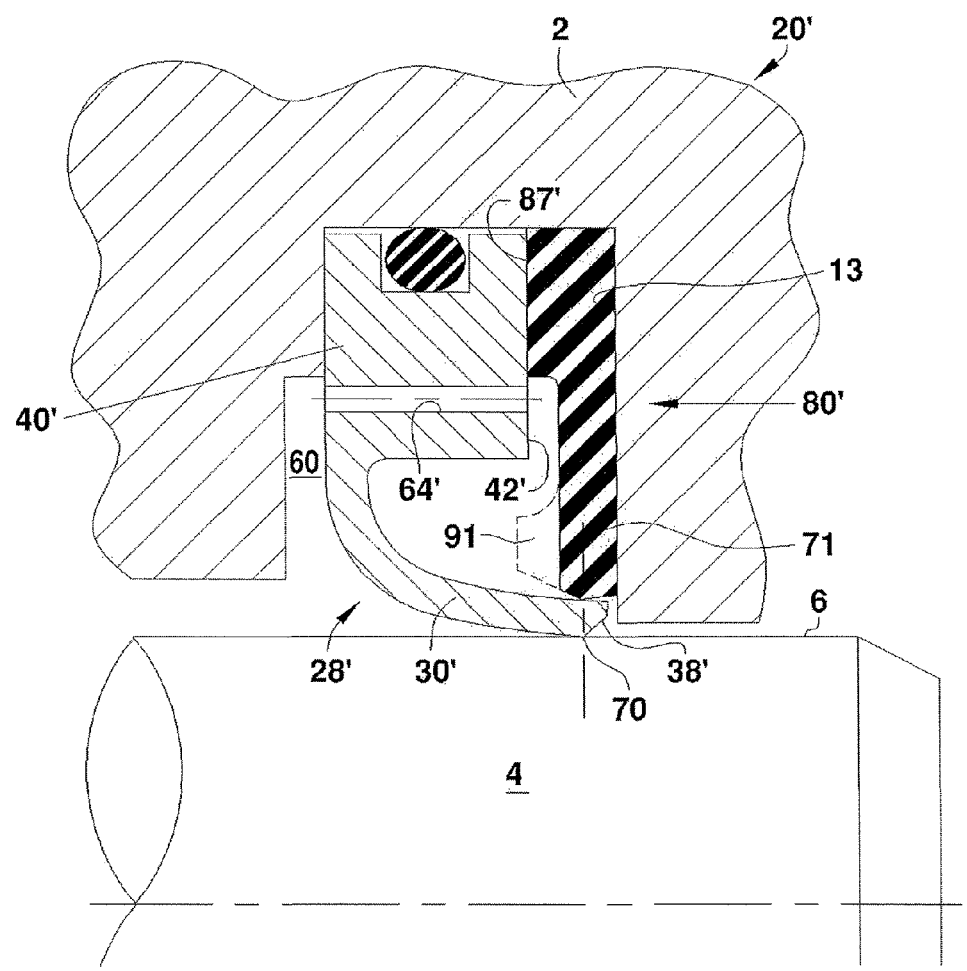
FIG. 11 is a partial cross-sectional view of yet a further form of a pressure balanced radial seal for rotary or linearly moving shafts.

In an alternative embodiment, the seal 20 is illustrated in FIGS. 10-13, as seal 20' positioned within the inner space 10 in a cavity configuration having an additional top surface 13. The first sealing member 28' of the seal 20' has a curved first portion 30' and a second portion 40' that may be adapted with the above described peripheral groove 108 of the retaining member 100. The first sealing portion 70 may be defined by the same surfaces 72 and 74 of FIG. 1-4, by a curved surface of FIG. 10, or by the corner of the distal end 38' of the first portion 30' being simply positioned in direct contact with the peripheral surface 6 of the member 4 along the sealing plane 71, as shown in FIG. 11. It would be understood that the first sealing portion 70 of FIG. 11 may be employed with embodiments of FIGS. 1-9. Furthermore, the second sealing member 80' may be provided in any of the above described configurations and is shown in FIGS. 10-11 as having a surface 87' directly abutting a surface 42' of the first sealing member 28'.

Furthermore, the second sealing portion 90 is disposed on an inner edge surface of the second sealing member 80' mediate surfaces thereof.

Figure 12:
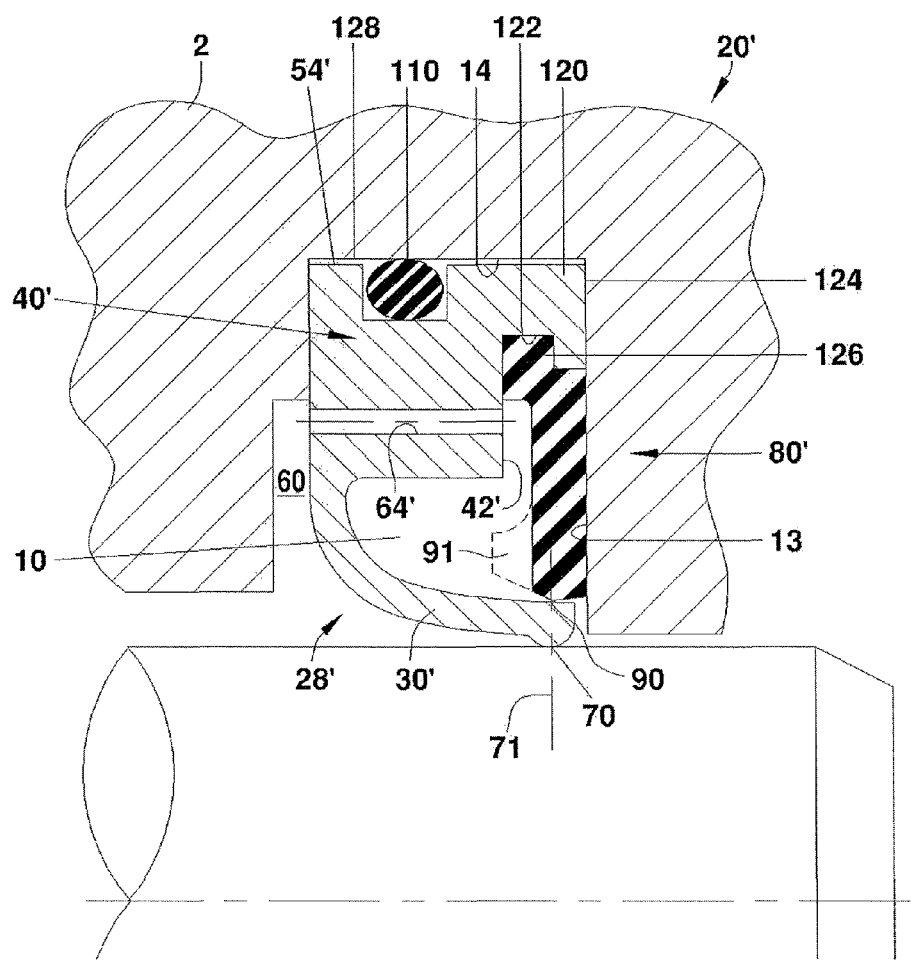
FIG. 12 is a partial cross-sectional view of another form of a pressure balanced radial seal for rotary or linearly moving shafts.

FIG. 12 illustrates the surface 42' of the first sealing member 28' being adapted with an annular abutment 120 having a cavity 122 and a surface 124 preferably disposed in direct contact with the surface 13 of the interior space 10. The second sealing member 80" is then adapted with a peripheral abutment 126 that is configured to be received within the cavity 122. It is presently preferred that the cavity 122 and abutment 126 are sized to apply axial force onto the first sealing member 28'. Furthermore, FIG. 12 illustrates that the peripheral surface 54' of the first sealing member 28 may be sized smaller than the side surface 14 so as to define gap 128 when the seal 20' is adapted with a resilient and compressible member 110.

Figure 13:
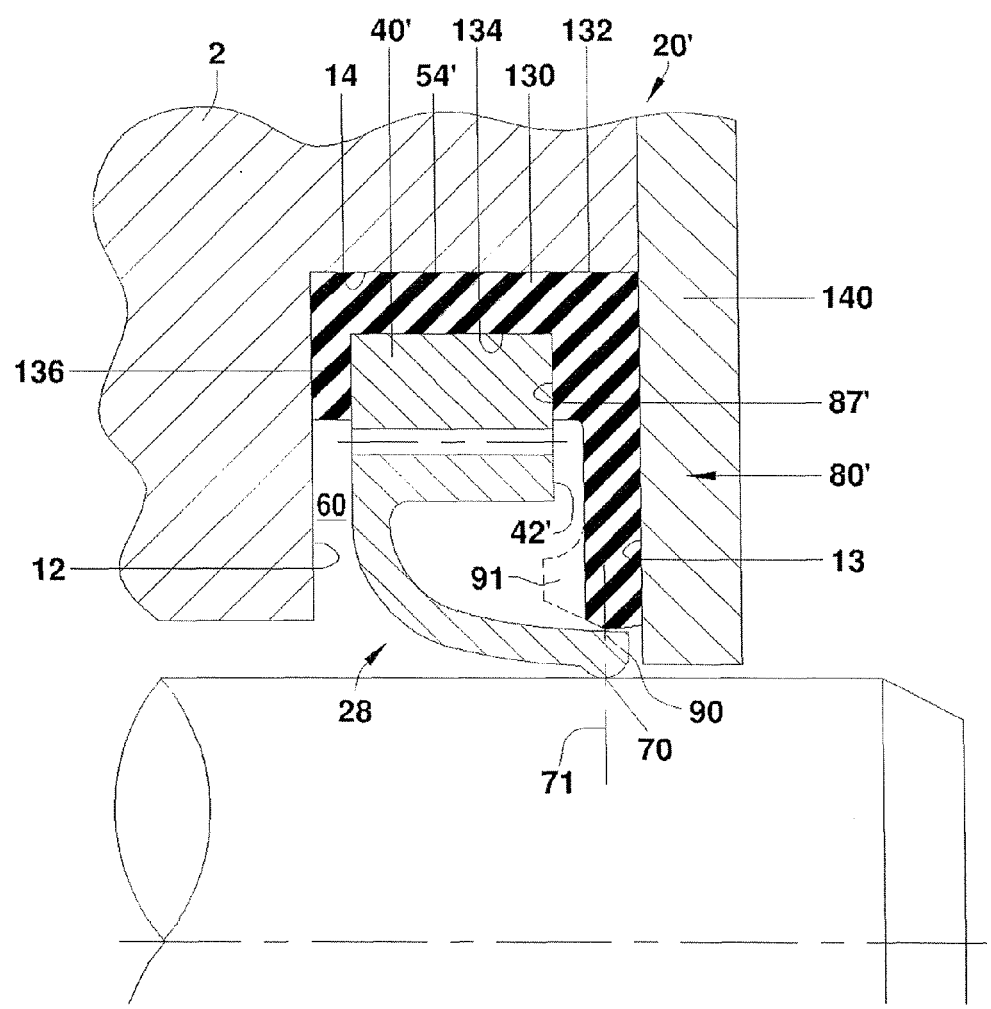
FIG. 13 is a partial cross-sectional view of yet another form of a pressure balanced radial seal for rotary or linearly moving shafts.

FIG. 13 illustrates that the surface 87' of the second sealing member 80' has been adapted with an annular abutment 130 having a cavity 134 formed therewithin and sized to partially receive the second portion 40' of the first sealing member 28' and further apply axial force thereonto so as to prevent rotation of the first sealing member 28'. The width of the resulting flange 136 of the abutment 130 is configured to provide the above described radial gap or passage 60.

It is further contemplated that the seal 20' of FIGS. 10-13 as well as the seal 20 of FIG. 1 may be provided as a unitary one piece seal that may be manufactured from a pair of materials with different degree of flexibility and compressibility.

Furthermore, the embodiments of FIGS. 1 and 10-13 may be provided within the interior space 10 of the open bore type, wherein the surface 13 then becomes part of a removable member 140, best shown in FIG. 13, that is fasten or otherwise secured to a portion of the body 2 after installation of the seal 20'. Alternatively, the removable member 140 may be positioned within the interior space 10 and retained with the above described groove 130 and retaining clip 132.

Figure 14:
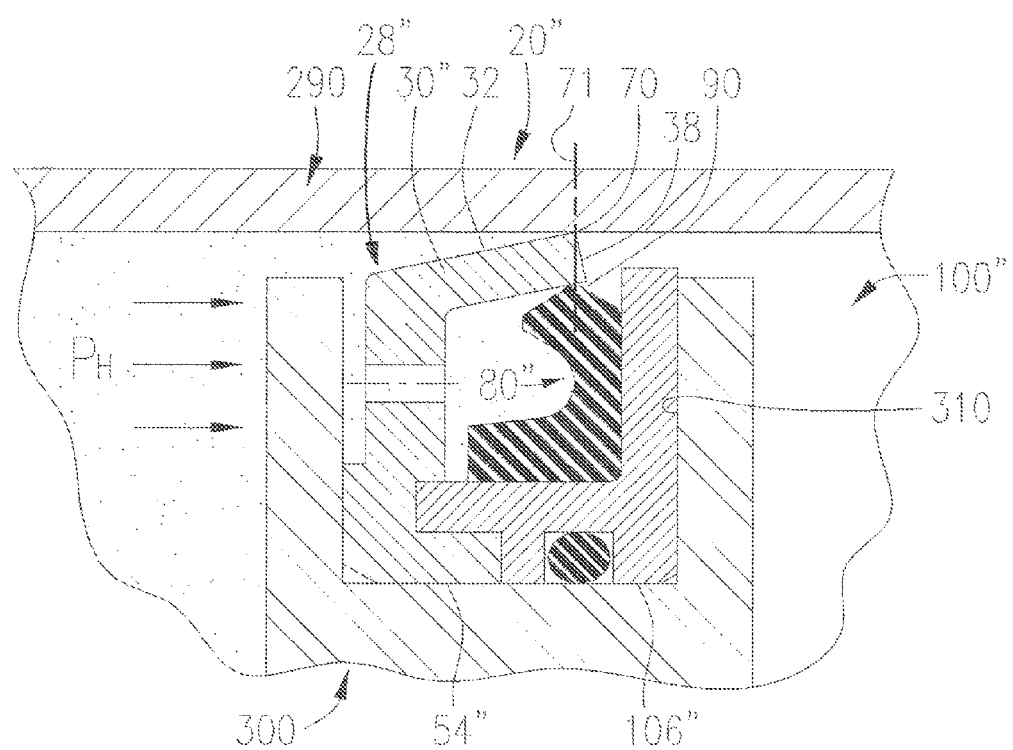
FIG. 14 is another partial cross-sectional environmental view of the seal of FIG. 1-5 or 7 employed within a pneumatic or hydraulic cylinder.
Figure 15:
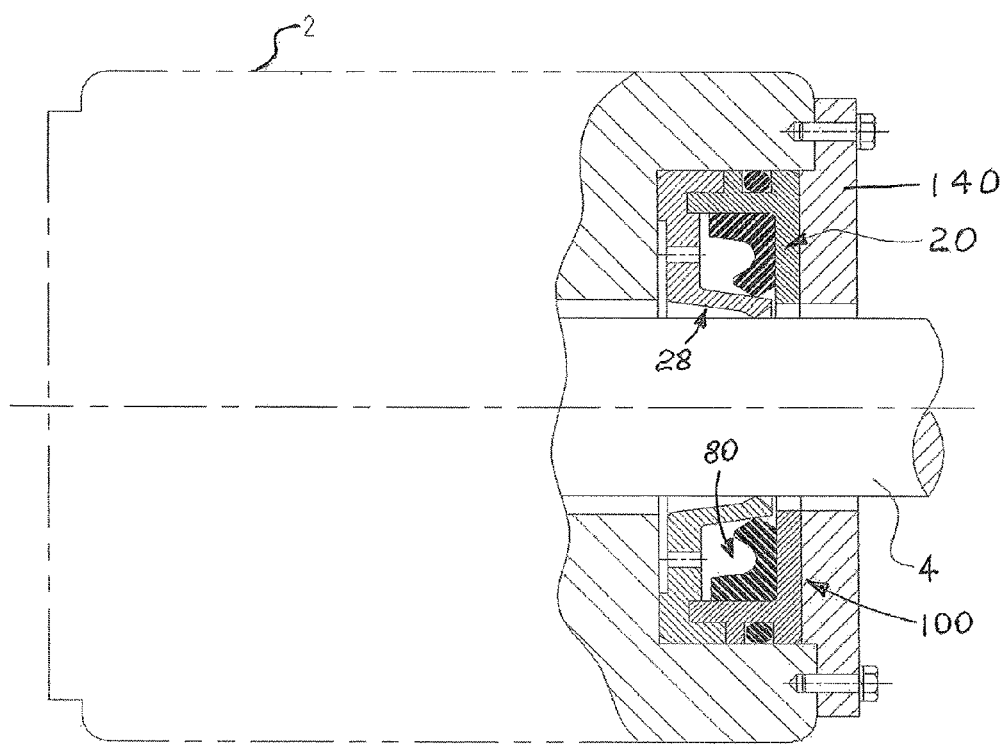
FIG. 15 illustrates the pressure balanced radial seal for rotary shafts installed within a pump.

Although the present invention has been shown and described in terms of sealing a rotating shaft in a pump or a gear motor, it will be apparent to those skilled in the art, that the present invention may be applied to other devices, employing shaft disposed within the fluid media under pressure. For example, the seal 20 may be provided as seal 20" within a pneumatic or a hydraulic cylinder 290 employing a piston 300, conventionally mounted for a linear reciprocal movement, wherein the seal 20" would be disposed within a peripheral groove 310 in the piston 300, as best shown in FIG. 14, so as to seal the pressurized region of the cylinder 290 to the left of the piston 300 in FIG. 14 from unpressurized or low pressure region to the right of the piston 300 in FIG. 14. It would be understood that the seal 20" is substantially identical to the seal 20, except that the first sealing member 28", the second sealing member 80" and the retaining member 100", when used, are radially inverted, so that the surfaces 54" and 106" are now inner surfaces disposed in direct contact with the bottom surface of the groove 310 and the first and second sealing portions, 70 and 90 respectively, face outwardly. Although not shown, the second seal 200 may be also positioned within the groove 310. The seal 20 of FIGS. 1-6 or seal 20' of FIGS. 10-13 may be further provided at the end of the cylinder 290 so as to seal the cylinder rod (not shown).

Furthermore, the press fit design of the seal 20 allows for ease of installation and predictable performance under most if not all operating conditions, although the "floating" type design of FIG. 6 is also contemplated by the instant invention.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. A seal arrangement positionable within a space in a body, the space receiving an shaft member for a rotation or linear movement therewithin, said seal arrangement comprising:
   (a) a first sealing member manufactured from a plastic or engineered polymer material including:
      i. a first portion having a proximal end thereof positioned in a close proximity to one surface of the space in a spaced apart relationship with a peripheral surface of the shaft member, the one surface of the space being disposed transverse to a length of the shaft member;
      ii. a first sealing portion disposed on or proximal to a distal end of said first portion, said first sealing portion further disposed in a direct contact with the peripheral surface of the shaft member during the rotation or the linear movement thereof,
      iii. a second portion extending from said proximal end of said first portion in a direction being transverse to the length of the shaft member and having a pair of generally planar surfaces spaced apart from each other to define an uniform thickness of said second portion,
      iv. a passageway disposed between one generally planar surface of said second portion and the one surface of the space, said passageway being in a fluid communication with a region of high fluid pressure,
      v. apertures formed in a spaced apart relationship with each other through said thickness of said second portion in said fluid communication with said passageway, and
      vi. a third portion terminating said second portion and having a first surface positioned in a direct abutment with the one surface of the space and a second surface positioned in a direct abutment with another surface of the space and defining exterior peripheral surface of said first sealing member, said third portion further having a peripheral flange defining a generally L-shaped cross-section of said third portion, wherein said second surface of said peripheral flange of said third portion is sized for an interference or a friction fit with the another surface of the space;
   (b) a second sealing member manufactured from an elastomeric material and including:
      i. a first surface of said second sealing member extending in said direction being transverse to the length of the shaft member and facing a region of a low fluid pressure,
      ii. a second surface of said second sealing member defining a cavity facing said second portion of said first sealing member, said first and second surfaces of said second sealing member defining a thickness thereof, and
      iii. a second sealing portion disposed on an edge of said second sealing member and being positioned for a contact with said first portion of said first sealing member;
   (c) a retaining member configured to retain said first and second sealing members within the space and including:
      i. a first portion of said retaining member extending in said direction being transverse to the length of the shaft member,
      ii. a second portion of said retaining member disposed concentric with the longitudinal axis of the shaft member and defining an L-shaped cross-section of said retaining member, whereby a third surface of said second sealing member is disposed in a direct contact with a surface of said second portion of said retaining member,
      iii. a notch formed in said second portion of said retaining member so that said third portion of said first sealing member is partially caged between the another surface of the space and a surface of said notch, and
      iv. a peripheral groove formed in said second portion of said retaining member proximal to and in communication with the another surface of the space;
   (d) an O-ring disposed within said peripheral groove and manufactured from an elastomeric material so as to exert a force onto the another surface of the space during use of said seal arrangement; and
   (e) wherein said apertures are sized to pass a fluid from the region of the high fluid pressure through a thickness of said second portion of said first sealing member into a space defined by interior surfaces of said first sealing member, said second sealing member and said retaining member so as to bias said second sealing member for a contact with said retaining member, bias said first sealing portion into said contact with the peripheral surface of the shaft member and bias said second sealing portion for said contact with said first portion of said first sealing member.

2. The seal arrangement according to claim 1, wherein each of said first and second sealing portions is configured as having a generally triangular, a trapezoidal or a curved surface cross-sectional shape at least prior to installation or said rotation or said linear movement of said member.

3. The seal arrangement of claim 1, wherein the body defines a housing of at least one of a pump, a gearmotor and a cylinder.

4. The seal arrangement of claim 1, further including another seal mounted within a region of a low fluid pressure in an axial spaced apart relationship with said second sealing member and in abutting contact with the peripheral surface of the elongated member, one or more apertures provided in the axial space between said second sealing member and said another seal through the body and wherein said another seal is configured to direct any fluid leakage from said seal arrangement into said one or more apertures.

5. The seal arrangement of claim 1, wherein said first sealing member is manufactured from a plastic or an engineered polymer material.

* * * * *